April 13, 1926.

J. L. VAN PELT

LUBRICATOR

Filed April 11, 1925

1,580,181

Inventor
Jesse L Van Pelt

By Herbert E. Smith
Attorney

Patented Apr. 13, 1926.

1,580,181

UNITED STATES PATENT OFFICE.

JESSE L. VAN PELT, OF PULLMAN, WASHINGTON.

LUBRICATOR.

Application filed April 11, 1925. Serial No. 22,335.

*To all whom it may concern:*

Be it known that I, JESSE L. VAN PELT, a citizen of the United States, residing at Pullman, in Whitman County and State of Washington, have invented certain new and useful Improvements in Lubricators, of which the following is a specification.

My present invention relates to improvements in lubricators especially adapted for use in connection with vehicle spring devices, wherein a lubricant carrier is utilized in connection with the spring device for causing lubrication of the spring leaves when the spring is depressed.

While the device of my invention is capable of use in other relations, I have specifically shown it in the accompanying drawings and hereinafter described it in connection with the front and rear spring devices of the Ford type of automotive vehicle.

The invention in its physical embodiment is designed as an attachment to existing vehicles and the attachment may be applied to the vehicle without necessity for any structural changes to the vehicle. In its physical embodiment the device of my invention involves the use of a lubricant carrier in the form of a pad interposed between the transverse spring and its frame bar, whereby when the spring is depressed or compressed the lubricant will be squeezed from the carrier for distribution over the leaves of the spring for lubricating purposes.

A pair of the lubricating devices form the equipment for a leaf spring, one device being located at each side of the longitudinal center of the spring.

In the accompanying drawings I have illustrated one complete example of the physical embodiment of my invention wherein the parts are combined and arranged according to the best mode I have thus far devised for the practical application of the principles of my invention.

Figure 1:
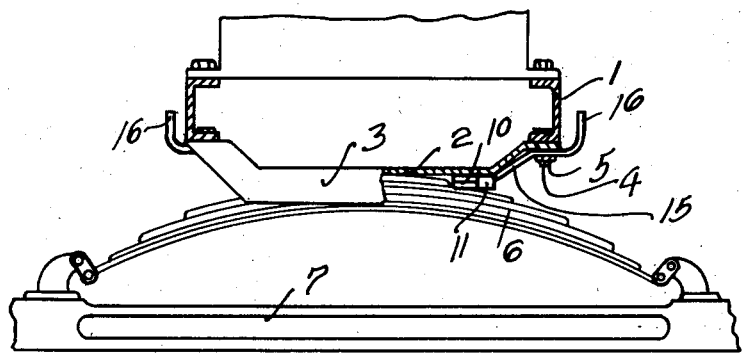
Figure 1 is a view showing in transverse section a portion of an automobile frame and the front transverse spring device, with the lubricating device of my invention applied thereto.

For convenience in understanding the construction and operation of the device and the general relation of parts I have illustrated in Figure 1 a portion of a Ford automobile frame, as 1 together with the transverse suspension bar 2 which is provided with side flanges 3, depending at the sides thereof and projecting downwardly over the vehicle spring. The transverse suspension bar 2 is attached at its ends to the vehicle frame by means of bolts 4 and nuts 5 and these latter devices are utilized for fastening the lubricating devices to the vehicle.

Figure 2:
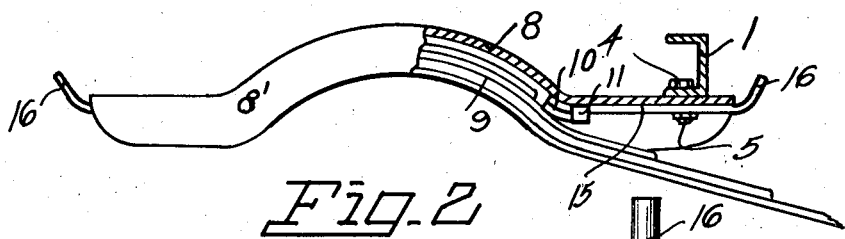
Figure 2 is a view showing as much of the rear spring suspension mechanism as is necessary to illustrate the application of the lubricating device of my invention thereto.
Figure 3:
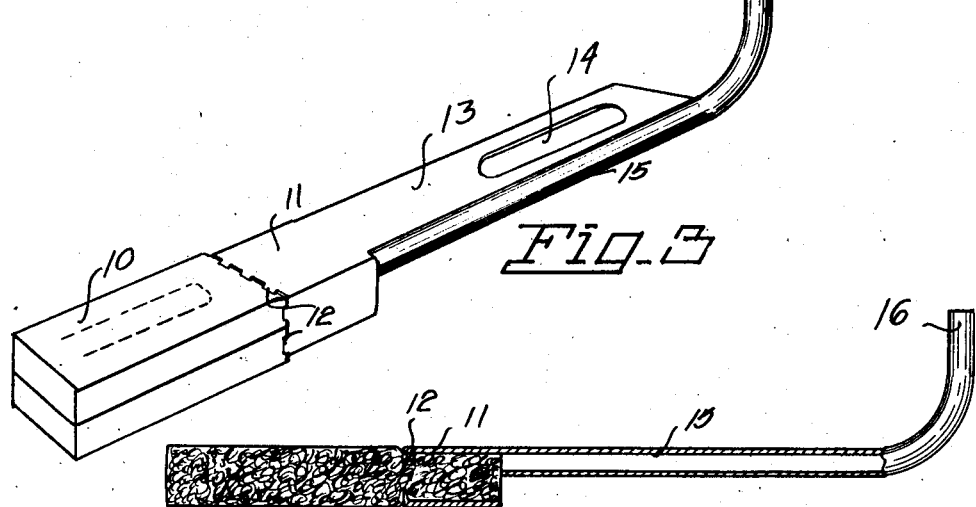
Figure 3 is an enlarged perspective view of one of the lubricating devices.
Figure 4:
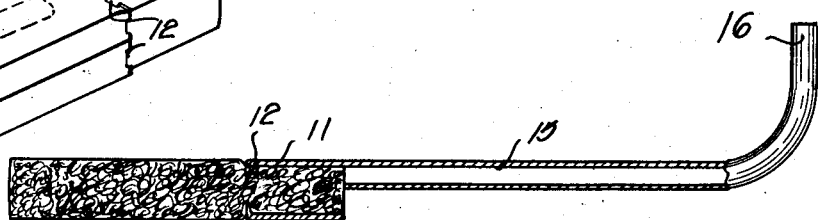
Figure 4 is a longitudinal sectional view of one of the lubricators or lubricating devices.

The front, transversely disposed leaf spring 6 in Figure 1 is connected as usual to the suspension bar 2 and suspended at its ends in customary manner above the front axle 7. In Figure 2 the rear suspending bar 8 is shown in connection with the rear spring 9 and the side flanges 8' of this arch bar project downwardly over the central portion of the elliptical leaf spring.

A pair of the lubricators or lubricating devices is used with each spring at the front and rear of the automobile and the lubricators are carried at opposite sides of the longitudinal center of the springs and secured by the bolts 4 and nuts 5 to the opposite side bars of the frame 1 of the automobile.

In carrying out my invention I utilize a lubricant carrier 10 in the form of a pad of absorbent material, as felt, which is here shown as fashioned of rectangular shape and designed for insertion between the under face of the transverse suspension bar 2 or 8, and the top face of one of the leaves of the springs 6 or 9, in order that the pad may be compressed when the spring is depressed or compressed.

The pad or carrier 10 for the lubricant, as oil, is retained in a rectangular metal holder 11 which is clamped at one end of the pad by means of integral teeth or spurs 12 struck up from the metal of the holder and forced by suitable tools or machinery into the body of the pad from its several sides.

For securing the device in place, the holder is fashioned with an attaching plate 13 having an attaching slot 14 therein for the accommodation of one of the bolts 4 of the vehicle frame 1. The attaching plate conforms to the shape of the transverse suspension bar and is fixed alongside and under said bar by the nut 5. In attaching the plate the nut is first removed, the plate is applied in place and slipped over the bolt 4, and then the nut 5 is turned on the bolt to clamp the plate to the transverse bar.

The supply of lubricant, as oil, is fed to the lubricating pad through an oil feed-pipe or tube 15, preferably fashioned integral with the attaching plate and extending along one side thereof from the holder 11 with which said pipe communicates. The outer end 16 of the oil pipe is bent or turned upwardly at a suitable angle and is designed to receive and contain a supply of oil which flows by gravity to the holder and pad through the pipe. The oil pipe may be closed by a suitable cap, or it may be closed with an oil cup or reservoir which may be filled from time to time for maintaining the oil supply.

When the spring is compressed it will be apparent that the carrier or pad 10 is also compressed and the lubricant is forced therefrom and distributed over the leaves of the spring for lubricating purposes.

From the above description taken in connection with my drawings it will be apparent that I have provided a device which is comparatively inexpensive in cost of production, but which is efficient in the performance of its function. The device may be applied for use with facility, and the pads renewed as required and replaced by fresh or new ones with convenience and dispatch.

Having thus fully described my invention what I claim as new and desire to secure by Letter Patent is—

1. In a spring lubricating device, the combination with a spring and its suspension bar, of a lubricating pad inserted between said spring and bar, a holder for the pad surrounding a portion thereof, an oil pipe connected with the holder, and means for attaching said lubricating device to the bar.

2. In a spring lubricating device, the combination with a spring and its suspension bar, of a lubricating pad inserted between said spring and bar, a holder surrounding a portion of the pad and an oil pipe connected with the holder, a slotted attaching plate rigid with the holder, and a bolt and nut for securing the slotted attaching plate to said bar.

3. A lubricating device comprising a lubricating pad, a holder surrounding a portion of said pad and an oil pipe communicating with said holder, and a slotted attaching plate rigid with the holder.

In testimony whereof I affix my signature.

JESSE L. VAN PELT.